June 4, 1968 R. CHARBONNIER 3,387,113

ELECTRONIC ASSEMBLY

Filed July 7, 1965 4 Sheets-Sheet 1

Roger Charbonnier
INVENTOR.

BY Michael P. Breston

ATTORNEY

Roger Charbonnier
INVENTOR.

BY Michael P. Breston

ATTORNEY

Roger Charbonnier
INVENTOR.
BY Michael P. Breston
ATTORNEY

June 4, 1968 R. CHARBONNIER 3,387,113

ELECTRONIC ASSEMBLY

Filed July 7, 1965 4 Sheets-Sheet 4

Roger Charbonnier
INVENTOR.

BY Michael P. Breston

ATTORNEY

United States Patent Office 3,387,113
Patented June 4, 1968

3,387,113

ELECTRONIC ASSEMBLY

Roger Charbonnier, Meudon, Seine-et-Oise, France, assignor, by mesne assignments, to Roger Charbonnier, Meudon, and Jean Royer, Saint-Cloud, France Filed July 7, 1965, Ser. No. 470,161
Claims priority, application France, July 9, 1964, 981,279; Mar. 2, 1965, 7,646
9 Claims. (Cl. 219—209)

ABSTRACT OF THE DISCLOSURE

An electronic assembly in which the respective components are thermally stabilized. The assembly includes a thermo-sensitive device made from a ferro-electric matrial doped with a small quantity of one or more metal modifiers, said device having a rapid increase of electric resistance in a regulation range situated on either side of a critical reference temperature. The device is mounted in thermal contact with the components and connected to an independent source of electric power.

This invention relates to thermally-stabilized assemblies and, more particularly, to electronic circuit assemblies in which the respective components are thermally stabilized.

Several methods are known for compensating the effects of variations of temperature in electronic circuits.

One known method consists in selecting components whose temperature coefficient is substantially constant. To these selective components are then added other components having, as nearly as possible, a total net temperature coefficient equal to zero as nearly as possible. Even if this method would allow the cancellation of errors of the first order, subsisting terms of the sacond order, which could not be neglected, would still remain, the thermal-time constants of the different components, not being identical, would still cause appreciable irregularities, and the thermal behavior of the electronic circuit could not be predicted with certainty.

Another known method consists in placing the electronic circuit in an isothermal enclosure in which the temperature is maintained higher than the highest ambient temperature possible.

Yet another known method consists in placing the electronic circuit in an isothermal enclosure in which the temperature is maintained in the neighborhood of the mean environmental temperature. The temperature is tied to a reference value by means of a regulator comprising a device of reversible Peltier effect.

Thse and other known methods have the undesirable characteristic of presenting a net time constant which can reach at times several minutes or even hours. Also, in these methods the active elements such as heaters and those of the Peltier effect have linear characteristics which make the effects of their intervention become proportional to time. Also, such methods necessitate the use of a complete chain of control such as a thermo-sensitive sensor, a reference source, a comparator, an amplifier and an active element.

The recent development of a new thermo-sensitive element, the temperature coefficient of which is positive and very high, modifies the basis of the problem and allows, in accordance with the invention, even individual thermal regulation of each electronic component in an electronic assembly. This thermo-sensitive element is known under the trade name of "Resistance C.T.P.E. 220ZZ/03." It is manufactured in Belgium by Manufacture Belge de Lampes Electriques.

These new thermo-sensitive elements are characterized by a known, relative-linear variation of resistance with temperature. However, the variation of resistance is very abrupt around a critical reference temperature which can be made to depend on the chemical composition of the thermo-sensitive element. A critical reference temperature within the range of 30° C. and 120° C. is quite normal. In the illustrated applications subsequently described, the critical reference temperature is approximately 80° C. The rate of variation of resistance can also be changed by controlling the composition of the materials used. The rate can vary between 10% and 90% per degree centigrade. The thermo-sensitive elements are made of various compositions according to the value of the desired critical reference temperature and the extent of the range of regulation. In general, the thermo-sensitive element is a ceramic made from a ferro-electric material doped with a small quantity of one or two metal modifiers of convenient valence subsequently fritted at a carefully chosen temperature. Among the different families of useable ferro-electric materials, those selected are the perovskites such as Ba $TiO_3$, mixed titanates of barium and strontium (Ba, Sr) $TiO_3$, mixed titanates of barium and lead (Ba, Pb) $TiO_3$, mixed tantalates of sodium and potassium (Na, K) $TaO_3$, or niobiate of potassium $KNbO_3$. It will be noted that the conditions of fritting of the Perovskites are preferably so determined that the amount of oxygen in the ceramic obtained should be stoichiometric. Among the metal modifiers which can be associated according to their valence with the above Perovskites, it is desirable to use antimony, tungsten, niobium, zirconium, yttrium, cerium, and lanthanum. This list is obviously not limitative and all compositions which present a rapid growth of electric resistance in a range on one side and the other of a critical reference temperature can be used for the realization of an electronic component with individual thermal regulation in accordance with the object of the present invention.

When to such a thermo-sensitive element is applied a substantially constant voltage, it can present in the neighborhood of its critical temperature a rapid diminution in the consumed power. To a first approximation, this phenomenon can be compared to a thermal discontinuity. Hence, this sudden diminution in the consumed power makes it possible to use the thermo-sensitive element as a temperature sensor, a reference comparator, an amplifier, and an active component.

Therefore, it is an object of this invention to provide thermally-stabilized circuits with individual thermal regulation of components by placing the component in thermal contact with a thermo-sensitive element adapted to be fed with an electronic voltage. As a result, the component maintains, regardless of the changes in the environmental temperature, a temperature very close to the critical reference temperature of the thermo-sensitive element.

The characteristics and advantages of this invention will appear more fully from the following description, especially when taken in conjunction with the accompanying drawings in which.

Figure 1:
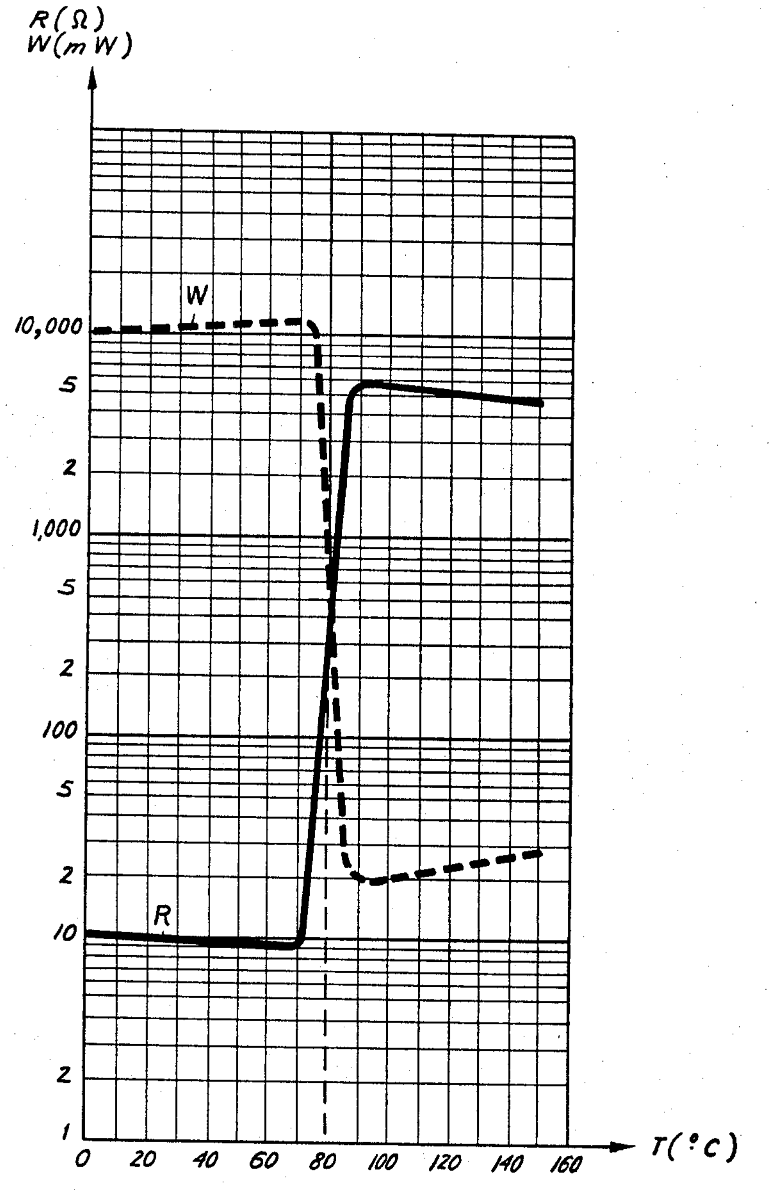
FIG. 1 shows a characteristic of the thermo-sensitive element in semi-logarithmic co-ordinates.

By way of example, one can consider the case of a small thermo-sensitive block (about 30 cubic mm.) of which the electric resistance has a value of 10 ohms at ambient temperature and which dissipates therefore under the application of a voltage of 10 volts DC or AC a power of 10 watts. The dotted curve of FIG. 1 shows that this power falls to 1 watt at 79° C. and to 0.2 watt at 80° C. If such a resistance is thermally coupled to the exterior ambient temperature by a thermal conductance of 10 milliwatts per degree centigrade, the necessary heating power will fall from 1 watt for −20° C. to 0.2 watt for +60° C. Under these conditions, such a thermo-sensitive element will cause a regulation to 2° C. approximately if the ambient temperature varies from −20° C. to +60° C. Therefore, the coefficient of merit of the temperature regulation is on the order of 80/2=40.

Figure 2:
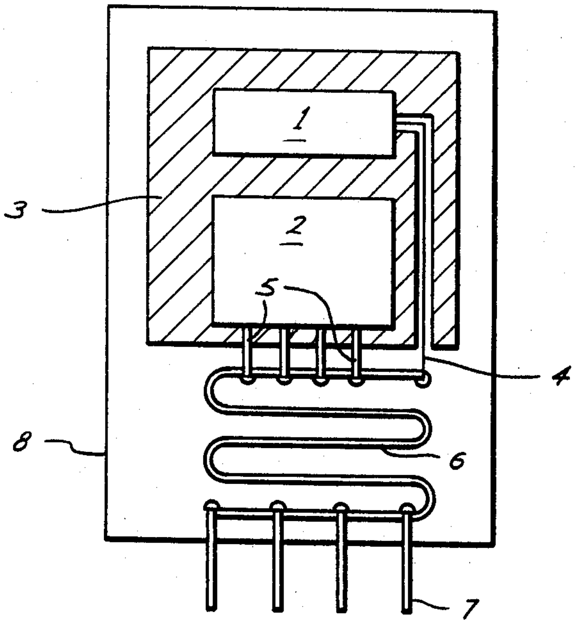
FIG. 2 shows schematically one embodiment of the invention which results in average temperature regulation.

In FIG. 2, the numeral 1 designates a resistive element with thermal discontinuity, the numeral 2 designates a component or group of components of which it is proposed to stabilize the temperature, and the numeral 3 designates a small metallic block in which are disposed in thermal contact as perfect as possible the elements 1 and 2. In this embodiment, the connection wires 4 leading from the thermo-sensitive element and those 5 leading to the component to be regulated are soldered to a flexible printed circuit 6 folded several times on itself. The different conductors which constitute the printed circuit 6 are connected to the solid pins 7 of the exterior case 8. Between the metallic block 3 and the case 8 can be disposed a filling material (not shown) which is electrically and thermally insulating.

Figure 3:
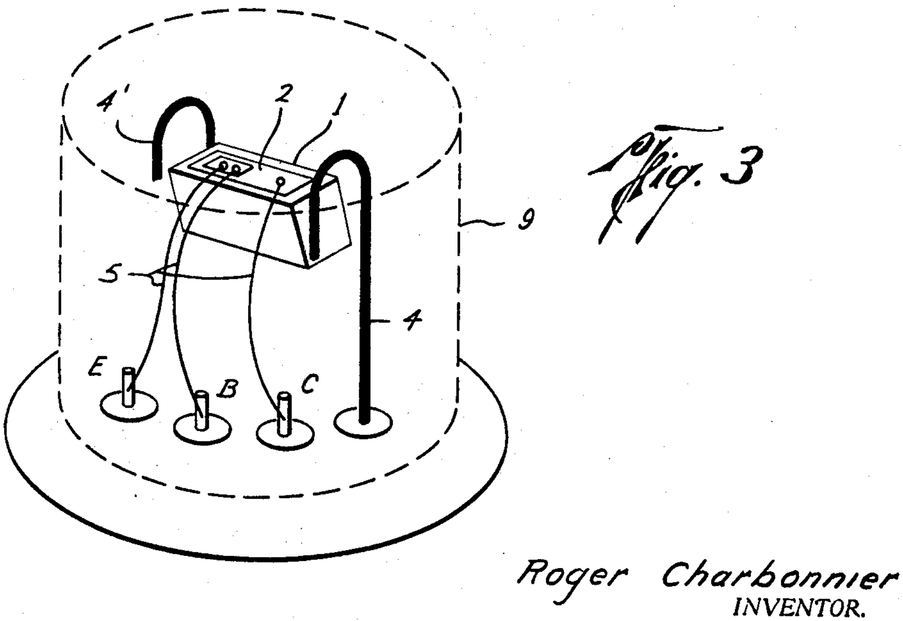
FIG. 3 shows another embodiment of the invention which also results in average temperature regulation.

FIG. 3 shows a second embodiment according to the invention, in which the resistance 1 is placed inside the box of the component. In this second embodiment the apparatus to be stabilized comprises several transistors. The resistance 1 is a small block of parallelepipedal shape which possesses two metallized opposing faces respectively connected to wires 4 and 4′ for supplying the heating current. The wires also serve in a secondary role to support the regulation block.

On one lateral face of the block 1, a transistor 2 is fixed by adhesive (in a manner which presents sufficient electric insulation). The electrodes of the transistor 2 are connected by wires 5 to the pins E, B, C of the base by means of three fine wires. On another face is disposed a second transistor, not shown in the figure, and connected in similar fashion. The container 9 ensures the sealing of the assembly and can eventually be filled with a material possessing a good coefficient of thermal insulation.

Such arrangements are perfectly suitable in the case where it is desired that the temperature at which the electronic components operate never descends below a predetermined temperature $T_S$. In this case, in effect, as soon as a voltage is applied to the apparatus which comprises the electronic components with individual thermal regulation (FIG. 2) or incorporated (FIG. 3), a rapid heating of the regulation blocks takes place which causes in some seconds the components to reach a temperature in the region of the critical reference temperature of the thermo-sensitive material which is chosen higher than $T_S$.

Owing to this arrangement, whatever the ambient temperature, the electronic components with individual thermal regulation mounted in the apparatus function at a higher temperature than a threshold temperature of security. This advantage is particularly appreciated in an apparatus which functions in open air and which includes transistors of which the gain must always be in excess of a minimum value.

On the other hand, when it is necessary to regulate with precision the temperature of operation of an electronic component, the arrangements described in FIGS. 2 and 3 can become insufficient in certain particular cases. As the arrangement of FIG. 3 possesses superior performance to that of FIG. 2, only the performance of the regulation component incorporated in FIG. 3 will be discussed herein. In the arrangement of FIG. 3, the current conductors which are respectively connected to the metallic faces of the thermal regulation block abut, in one part or another, the zones occupied by the electronic components. To avoid the short-circuiting of the block of thermo-sensitive material, it has obviously been impossible to metallize these intermediate zones and to solder directly on the faces of the block the components of which it is desired to regulate the temperature. The means employed to fix the component on the thermo-sensitive block has been to glue it on, for example, by means of synthetic resin. Thus, an insulating layer of which the non-negligible thermal insulation impedes the said component from taking the temperature of its support by reason of its dissipation proper and the parasitic thermal leakage constituted by its connections, is introduced between the component and the thermal regulation block.

Furthermore, as the conductors connected to the extremities of the thermal regulation block each constitute a determined thermal leakage, one thin section of thermo-sensitive material situated in the intermediate part of the block is carried to the critical reference temperature while the metallized faces of the block are at lower temperatures.

The properties of the thermo-sensitive material which can be utilized for constituting the thermal regulation block are known. These materials present, according to a generally admitted hypothesis, the particularity of supporting a reversible modification of the crystalline structure of their molecules when the latter are carried to a critical reference temperature, which molecules change then abruptly the value of their electric resistance. In consequence, if the homogeneity of the material is sufficient and in the absence of all exchange of energy other than that realized by the supply voltage applied to the thermal regulation block, the sections successively lying between the metal faces of the block are one by one isothermal. Under these conditions, it is obvious that the quasi-totality of the supply voltage applied to the thermal regulation block appears in all parts in the slice of molecules of which the temperature is equal or greater than the critical reference temperature. The thickness of this slice, which is notably proportional to the thermal conductivity of the thermo-sensitive material, is small compared with the thickness of the regulation block. It clearly appears, therefore, that thermal gradients exist in the mass of the regulation block, their importance being directly a function of the heterogeneity and of the thermal resistivity of the thermo-sensitive material. Furthermore, these two parameters are related to the extent of the range of functioning of the thermal regulation block, which range extends to all parts of the critical reference temperature.

These various particularities of the thermo-sensitive materials employed to constitute a thermal regulation block are the source of two principal inconveniences which appear whenever a non-negligible power must be dissipated in the components themselves.

In the case of the arrangement of FIG. 3, the slice of molecules carried to the critical reference temperature displaces itself between the metallic faces of the regulation block without the general resistance of the block having to vary significantly. One such arrangement is particularly inconvenient because the exact temperature at which the components fixed to the regulation block are carried is not predetermined, although situated in the regulation range of the thermo-sensitive material. Furthermore, if one of the electronic components dissipates an energy different from that produced by the other component, it is obvious that the slice of molecules carried at the critical temperature is no longer parallel to the metallized faces of the regulation block, which introduces a notable difference between the temperatures of the components.

Therefore, the arrangement described with reference to FIG. 3 (and especially with reference to FIG. 2) neither permits the perfect stabilization of the operation temperature of each component nor, above all, the assurance of their isotherm.

This is why the main object of the invention is to propose a second form of electronic component with thermal regulation incorporated in which the stabilization of the temperature of each particular circuit element and the isotherm of several elements fixed to the same thermal regulation block are assured at the same time.

In relation to a new industrial product, the object of the invention equally concerns a base for an electronic component incorporating thermal regulation.

According to the invention, an electronic component with incorporated thermal regulation of the kind comprising at least one circuit element mounted on a support of thermo-sensitive material presenting a rapid increase of electric resistance in a given range of regulation situated on either side of a critical reference temperature, the said support and the said element being united by electric current conductors to terminals mounted in a base, is chaarcterized in that the said thermo-sensitive support is in the form of a button in which the two faces are metallized and connected to two of the said conductors. One of the said faces, called the warm face, carries the said current element and is coupled to the ambient temperature by a parasitic thermal resistance of important value whereas the other face, called the cold face, is coupled to the said ambient by a thermal resistance of which the value is small compared with that of the former.

According to a particular characteristic of the invention, the cold face of the thermo-sensitive button is solid with the base of the component.

As a result, an important asymmetry between the respective thermal leakages applied to the faces of the regulation block is created, which leaves the face of the thermo-sensitive button in contact with the base of the component to take a temperature substantially less than that of the other face of the button. Under these conditions, the slice of molecules carried to the critical reference temperature corresponds in practice with the face of the button to which are fixed the circuit element or elements of which the regulation temperature is desired.

According to a first complementary characteristic of the invention, the fixing of the circuit element on the warm face of the thermo-sensitive button is ensured by means of a slender disc of good electrical insulation and good thermal conductivity, the two faces of the disc being metallized and respectively soldered to one of the terminals of the circuit element and to the warm face.

As a result, the circuit element is electrically insulated from the thermo-sensitive button while being in good thermal contact with the warm face of the button. Furthermore, it is easy by a diametrical groove traced on the free face of the thin disc to realize two isothermal sectors electrically insulated from one another and on each of which can be soldered a circuit element.

Moreover, as the power eventually dissipated in one of the circuit elements is applied to the warm face of the button across the thin disc, a priori isothermal, one such addition modifies only very little the temperature of the face since this is already at the critical reference temperature. As a consequence of this carriage of power, it can, in effect, be considered that the thickness of the slice of molecules which has jumped the critical temperature goes to augment, that the general resistance of the button goes to make the same, and, therefore, that the power applied by the supply goes to diminish and attain a new state of equilibrium.

According to a second complementary characteristic of the invention, the thermal resistance intercalated between the warm face of the thermo-sensitive button and ambient is less than the ratio of the deviation which exists between the temperature limit above the range of regulation and the maximum ambient temperature by the minimum power which can be applied to the button.

According to a third complementary characteristic of the invention, the thermal resistance intercalated between the warm face of the thermo-sensitive button and ambient is higher than the ratio of the deviation which exists between the lower temperature limit of the range of regulation and the minimum ambient temperature by the maximum power that it is possible to dissipate in the button.

As a result of these complementary characteristics according to the invention, the thermo-sensitive button takes always, and whatever the ambient temperature and the power dissipated in the circuit elements, a temperature situated in the thermal regulation range of the material which constitutes it.

Figure 4:
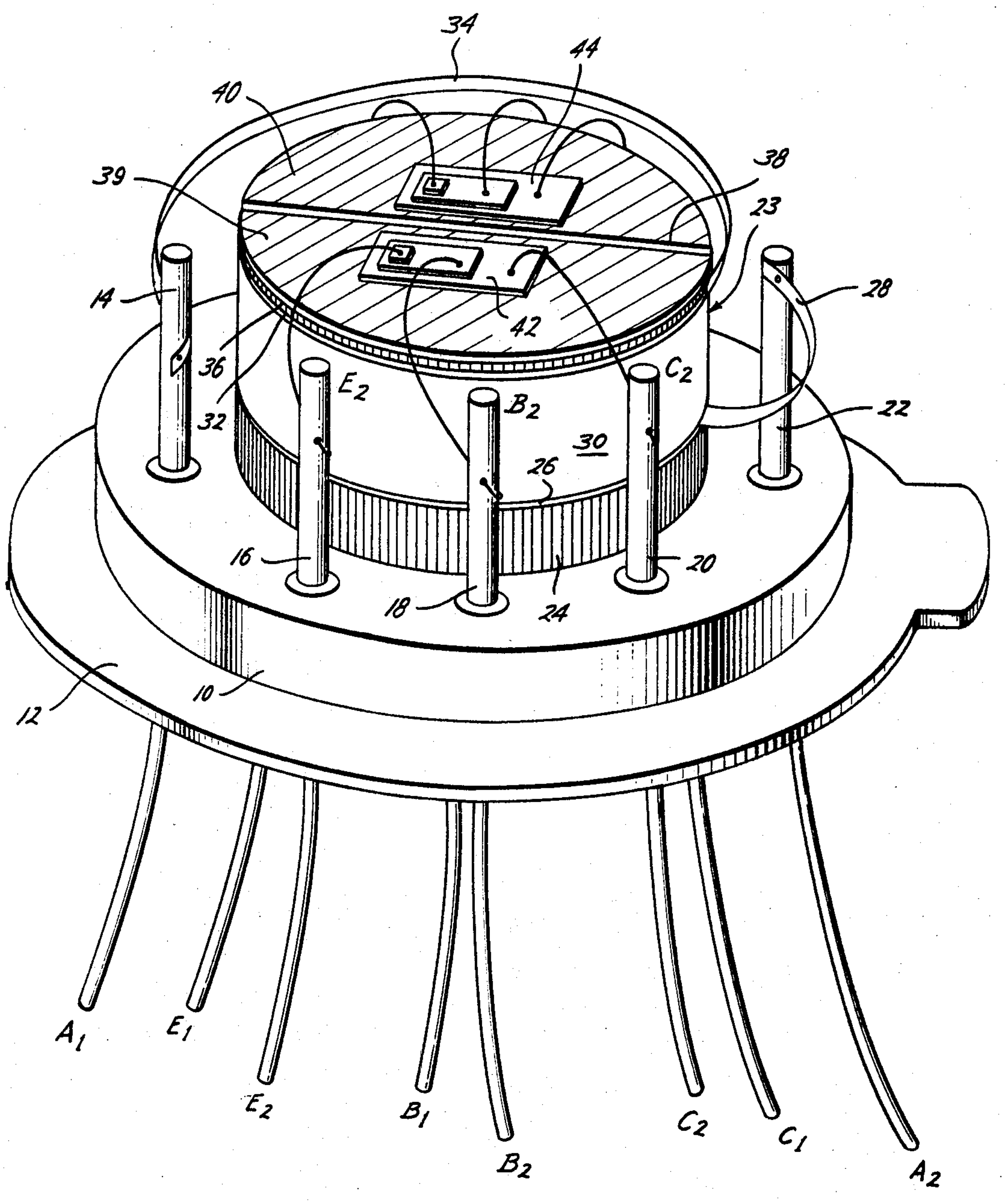
FIG. 4 shows an embodiment of the invention which is characterized by high performance thermal regulation.

According to FIG. 4, the numeral 10 designates a metallic base provided with a collar 12 adapted to receive a protecting cover not shown. Eight insulated pins are fixed on the periphery of the base 10. Five of these pins, 14, 16, 18, 20 and 22 appear in the figure; the three others, 17, 19 and 21 are hidden.

In the center of the base 10 is soldered a cylindrical pedestal 23, having a diameter of about 4 mm. and a height of about 3 mm. adapted to receive the circuit elements of the electronic assembly. The cylindrical pedestal 23 comprises in its lower part a circular plate 24 having a thickness of one millimeter and being made of compressed and sintered glass powder. The plate is metallized on its two faces. In the preferred embodiment, the thermal resistance existing between the two faces of the plate 24 was 40° C. per watt. This resistance can be adjusted by action on the thickness and the density of the plate 24, which density increases with the pressure during the formation of the plate. To the metallic layer 26 fixed to the upper face of the plate 24 is soldered a metallic ribbon 28, which is elsewhere spot-soldered to the terminal 22.

A cylindrical button 30 of 2 mm. thickness, the faces of which are metallized, is soldered to the plate 24. The button 30 is made of thermo-sensitive material with a rapid variation of resistivity. Its critical reference temperature may be, for example, 80° C. and the gradient of electric resistance, at least in the central part of the range of regulation which extends from 72 to 80° C., may be on the order of 50% per degree.

Under 72° C. the electric resistance of the button 30 varies from 40 to 20 ohms approximately. Above 88° C. the electric resistance of the button 30 varies from 6,000 to 12,000 ohms approximately. At 80° C. the electric resistance of the button 30 is 400 ohms and the thermal resistance between its faces is 35° C. per watt.

Soldered to the metallic layer 32 which is fixed to the upper face of the thermo-sensitive button 30 in a region near the pin 22, is a metallic ribbon 34, which is spot-soldered later to the pin 14. Equally fixed by soldering to the metallic layer 32 is a thin disc 36 of beryllium oxide, previously metallized on its two faces. The metallic layer fixed to the upper face of the disc 36 is divided by a groove 38 traced along one diagonal into two sectors 39 and 40 insulated one from the other. On the sector 39 is soldered the collector of a first transistor 42, and on the sector 40 is soldered the collector of a second transistor 44 identical to 42. A maximum power of 50 milliwatts can be dissipated in each of these transistors. The emitters, bases and collectors of the transistors 42 and 44 are respectively connected by fine metallic wires to the pins 16–17, 18–19, and 20–21 fixed in the base 10. A laboratory test has shown that, in such an arrangement, the parasitic thermal resistance constituted by these different wires and by the ribbon 34 placed between the face 32 and the base 10 is about 1.000° C. per watt.

External connections $A_1$–$A_2$, $E_1$–$E_2$, $B_1$–$B_2$, $C_1$–$C_2$ are led to the pins fixed in the base 10.

If the terminals of an external supply source providing, for example, at least 12 watts at 24 volts are connected to the connections $A_1$–$A_2$, this power is, in this instance, dissipated in the button 30. In effect, the button 30 possesses then a minimum electrical resistance, since the temperature is that of ambient which is a priori less than 72° C.

The button 30 is heated rapidly and soon attains 72° C., which is the lower limit temperature of the regulation range of the thermo-sensitive material which constitutes it. Soon after the threshold of 72° C. is passed, the electric power dissipated in the button 30 decreases at 50% per degree and an equilibrium point in the neighborhood of the critical reference temperature is therefore rapidly attained.

It will be assumed that the ambient temperature can vary between −20° C. and +60° C. Under these conditions, in order that the temperature of the warm face 32 of the button 30 should never descend below 72° C., the lower limit of the range of regulation, it is necessary that the thermal resistance which connects the face to the ambient temperature should be greater than a minimum predetermined value. This minimum thermal resistance is equal to the ratio between the deviation, which exists between the lower temperature limit of the regulation range and the minimum ambient temperature, and the maximum power that one can apply to the thermosensitive button. In the present case, the minimum thermal resistance is therefore equal to 92/12, or say 7.7° C. per watt.

Moreover, as a power of 100 milliwatts may be dissipated in the transistors 42 and 44, and that at 88° C., the upper temperature limit of the regulation range, a power of 96 milliwatts is still applied by the feed source to the button 30, the thermal resistance placed between the warm face of the button and ambient must be less than 28/0.196, or say 143° C. per watt. In general, this maximum thermal resistance is equal to the ratio between the deviation that exists between the upper temperature limit of the range of regulation and the maximum ambient temperature and the minimum power which can be applied to the button 30 in this case.

In the course of the description of the electronic component represented in FIG. 4, it was stated that the thermal resistance of the conductors in conjunction with the face 32 is 1.000° C. per watt, that of the thermo-sensitive button 30 is 35° C. per watt, and that of the isolating plate 24 is 40° C. per watt. Moreover, the thermal resistance to the ambient of a base provided with its protecting case is equally, in the particular example, chosen to be 50° C. per watt. Under these conditions, a thermal resistance of 90° C. per watt is intercalated between the cold face 26 of the button 30 and ambient, while a parasitic thermal resistance of 1.050° C. per watt is intercalated between the warm face 32 and ambient. The total thermal resistance placed between the warm face 32 and ambient is given by the combination of these different resistances described above, its value being substantially equal to 120° C. per watt. Thus, this value suits the purpose since it is comprised between 7.7 and 143° C. per watt. Under these conditions the theoretical power consumed by the button 30 in order to maintain the warm face 32 of the pedestal 23 at 80° C., when the ambient temperature shifts between −20 to +60° C., varies from 0.833 to 0.167 watt.

It will be understood that this regulation is imperfect, mainly because of the heterogeneity of the different molecules of which the thermo-sensitive button 30 is composed, but also because of the parasitic thermal leakage applied to the face 32. In effect, this parasitic thermal leakage leads the slice of molecules carried at the critical reference temperature to penetrate a little into the button 30, which therefore causes the temperature of the layer 32 to be slightly lowered. The actual quality of the thermal regulation will be made precise hereafter by measuring a particular characteristic of the transistors 42 and 44 as a function of the temperature of the base 10.

The warm face 32 of the thermo-sensitive button is connected to the transistors 42 and 44 by means of a disc of beryllium oxide 36. The properties of this body are known: good electrical insulation and good thermal conductivity. Because of the presence of the disc 36 and, of the groove 38 traced in the metallic film which covers it, the transistors 42–44 and the metal layer 32 are eletrically insulated from one another, but being in good thermal contact they are, therefore, all three practically isothermal. This isothermal state is maintained, or at least remains in a narrow range, when the power dissipated in one or the other of the transistors 42–44 varies.

Figure 5:
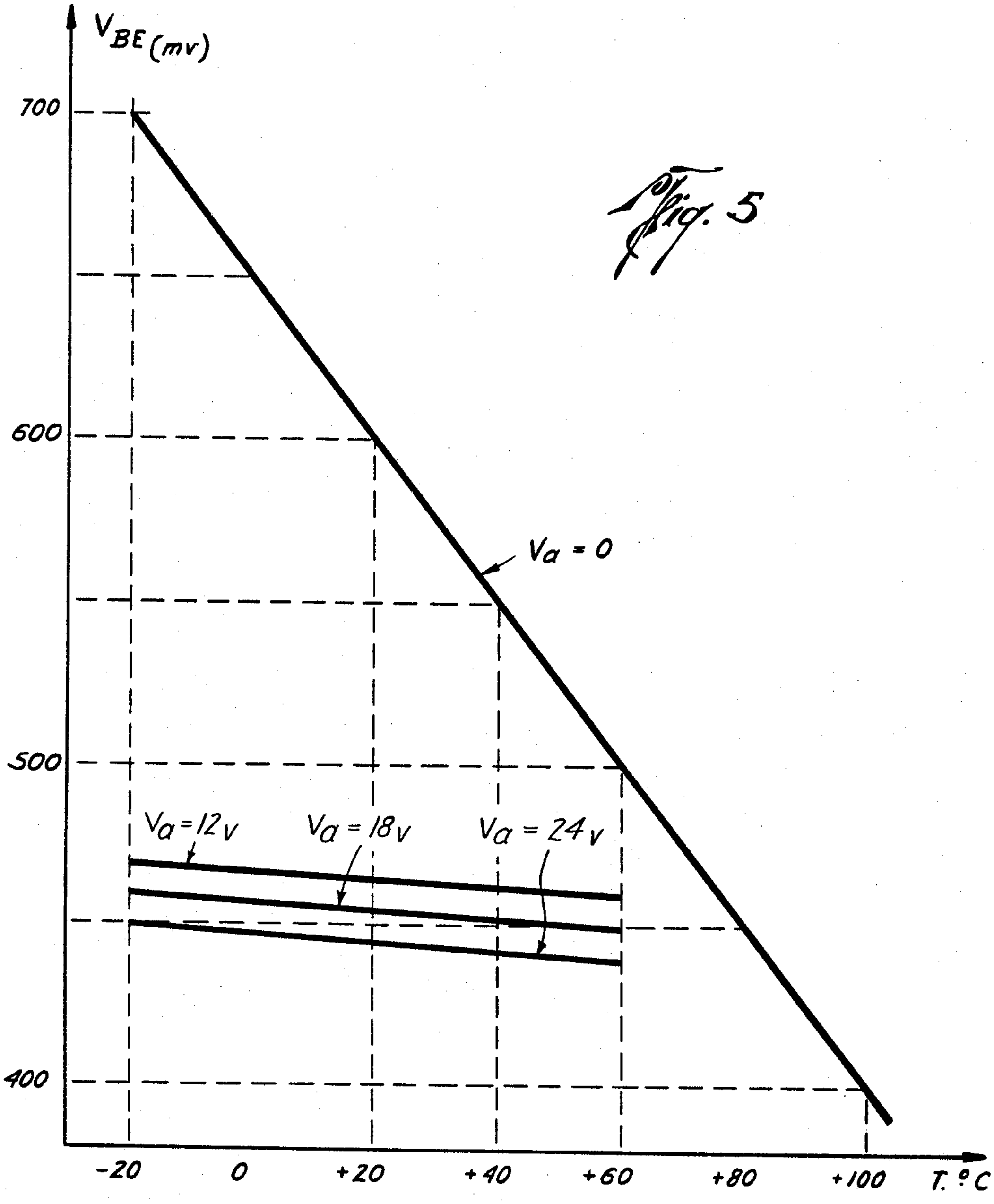
FIG. 5 shows a series of curves illustrating the behavior of the regulation of the embodiment of FIG. 4.

There is shown in FIG. 5, the regulation curves set up again on one of the transistors 42–44 mounted on the pedestal 23. Four curves are shown according to the supply voltage $V_a$ which is applied to the button 30, i.e., $V_a=0$, 12, 18 or 24 volts. The characteristic parameter of the temperature of the junction of the transistor is the voltage $V_{BE}$ that is known to decrease linearly with temperature. Therefore, the curve $V_a=0$ furnishes for each value of the temperature at the junction the value of the voltage $V_{BE}$ of the transistor.

In the particular case of $V_a=24$ volts, the voltage $V_{BE}$ ranges from 450 to 440 millivolts for an ambient which varies from −20 to +60° C. The temperatures at the junction BE which correspond to the voltages $V_{BE}$ are respectively 80 and 84° C., that is to say that the coefficient of merit of the regulation is 20. This coefficient is sensibly maintained if the supply voltages become 18 and 12 volts, but time tests show that the extreme temperatures of the junction BE of the transistor are respectively 76–80° C. and 72–76° C. As 72° C. is the lower temperature limit of the regulation range of the thermo-sensitive material, the minimum value of the supply voltage which permits regulation from −20° C. is in principle 12 volts.

The experimental curves of FIG. 2 show, moreover, that a substantially linear relation exists between the value $T_j$ of the temperature of the junction obtained for the transistors 42–44, the value $V_a$ of the supply voltage and the ambient temperature $T_a$: $T_j=T_o+K_1V_a+K_2T_a$ or again if $T_j$ is constant: $V_a=V_1-KT_a$. Therefore, to obtain a rigorously constant junction temperature, it is sufficient theoretically to cause the supply voltage $V_a$ to follow a linear function decreasing with the ambient temperature $T_a$. Such a relation can easily be obtained with the aid of a thermo-sensitive sensor of which the output signal modifies the coefficient of transfer of a command element intercalated between a source of voltage and a predetermined number of thermo-sensitive buttons mounted in several electronic components submitted to the same ambient temperature.

According to the present invention, another advantage of the electronic component with incorporated thermal regulation concerns the possibilities of fabrication of such a component. In effect, the pedestal 23 is constituted by the assembly of three cylindrical plate elements of diameters approximately equal, the plate 24, the button 30, the disc 32, of which the faces are metallized, which permit the employment of solder for fixing them to one another, to the base 10 and to the transistors 42–44. A possible assembly technique will consist after initial tinning of the different metal layers and the extremities of the ribbons 28 and 34, to superimpose the base 10, the plate 24, ribbons, button 30, disc 32 and transistors 42–44, to utilize an elastic holding element afterwards passing the whole into an oven. If, during this operation, the transistors are omitted, a new industrial product is realized which is a special base for an electronic component with incorporated thermal regulation.

It will be understood that the invention is not limited to the form of realization described hereinbefore which has been given solely by way of non-limiting example, but on the contrary, can be made the object of various modifications.

First of all, it is obvious that the several numeric characteristics of the constituents of the pedestal 23 have been cited only by way of support for the description and can have other values without having to be outside the invention.

Furthermore, in the present case, the plate 24 can be dispensed with and replaced with a layer, more or less fine, of synthetic resin which will have a thermal resistance lying in the interval of the values foreseen by the invention. In the same way, the disc 36 intercalated between the transistors 42–44 and the warm face 32 of the button 30 can be suppressed, the said transistors being directly fixed by adhesive on the face 32. These two variations do not permit performances as good as the arrangement of FIG. 4 but they can, however, just as the arrangements of FIGS. 2 and 3, become proper to electronic components of which it is desired to maintain the temperature of functioning above a threshold temperature.

Moreover, the beryllium oxide which constitutes the disc 36 can be replaced by boron nitride or by any other material of which the electric insulation properties and the thermal conduction properties are comparable.

On the other hand, in place of the compressed and sintered glass powder which constitutes the plate 24, any other material having the same dielectric properties can be utilized. As for the plate 24, it is possible to replace it by a ring of predetermined thickness in which the thermal resistance is adjusted by varying the diameter of the central bore. In the case where several circuit elements must be fixed on the free face of the disc 36, the elements being electrically insulated from one another, a sufficient number of insulating sectors should be bound in the metallic coating on the face. These different circuit elements can obviously be different from one another and comprise transistors, diodes, resistors, capacitors or even integrated circuits.

What is claimed is:

1. An electronic assembly comprising: a metallic base for said assembly having pins disposed around its periphery, a pedestal soldered to the central part of said base, said pedestal being formed by the stacking of three constituent plates: an electronic insulating plate of relatively large thermal resistance, a plate of thremo-sensitive material having a rapid increase of electric resistance in the neighborhood of a reference temperature, and a thin electrically insulating plate of good thermal conductivity; the faces of said thermo-sensitive plate being electrically connected to said pins.

2. An electronic assembly with built-in thermal regulation, said assembly including a thermo-sensitive device having a positive temperature coefficient and a sharp resistance variation in a regulation range located on both sides of a critical reference temperature; said device being shaped as a solid block having a plane warm face; at least one electronic component mounted on said plane face and electrically insulated therefrom, and means for applying electric power to said solid block independently of said component.

3. An electronic assembly as claimed in claim 2, said assembly including a base, first and second pluralities of terminals mounted in said base, and first and second pluralities of current conductors respectively connecting said solid block and said component to said first and second pluralities of terminals.

4. An electronic assembly as claimed in claim 3, wherein the said solid block has a further plane cold face, the said warm and cold faces being metallized and connected to the said first plurality of terminals, the warm face being coupled to the ambient temperature by a first parasitic thermal resistance while the cold face is coupled to the ambient atmosphere by a second parasitic thermal resistance, the first thermal resistance being substantially larger than the second thermal resistance.

5. An electronic assembly as claimed in claim 4, wherein the total parasitic thermal resistance between the warm face and the ambient atmosphere is smaller than the ratio of the deviation which exists between the upper temperature limit of the regulation range and the maximum ambient temperature by the minimum power which can be applied to the said solid block.

6. An electronic assembly as claimed in claim 4, wherein the total parasitic thermal resistance between the warm face and the ambient atmosphere is larger than the ratio of the deviation which exists between the lower temperature limit of the range of regulation and the minimum ambient temperature by the maximum power which it is possible to dissipate in the said solid block.

7. An electronic assembly as claimed in claim 4, wherein an electrically insulating member of average thermal conductivity is placed between said base and said cold face, the said member being metallized on its two faces, which are respectively connected to the said base and the cold face.

8. An electronic assembly as claimed in claim 4, wherein an electrically insulating further member of good thermal conductivity is placed between the component and the warm face, the two faces of the said further member being covered with a metallic layer and respectively connected to the circuit element and to the warm face.

9. An electronic assembly as claimed in claim 8, wherein the said metallic layer includes several sectors insulated from one another.

References Cited

UNITED STATES PATENTS

| | | | |
|---|---|---|---|
| 2,721,182 | 10/1955 | Clement | 310—8 X |
| 2,731,564 | 1/1956 | Edlstein | 310—8.9 X |
| 3,219,583 | 11/1965 | Cook et al. | 310—8 X |
| 3,294,988 | 12/1966 | Packard | 310—8 |

RICHARD M. WOOD, *Primary Examiner.*

C. L. ALBRITTON, *Assistant Examiner.*

Notice of Adverse Decision in Interference

In Interference No. 97,841, involving Patent No. 3,387,113, R. Charbonnier, ELECTRONIC ASSEMBLY, final judgment adverse to the patentee was rendered May 15, 1974, as to claim 2.

[*Official Gazette October 1, 1974.*]